US010438586B2

(12) United States Patent
Ikeno et al.

(10) Patent No.: US 10,438,586 B2
(45) Date of Patent: Oct. 8, 2019

(54) VOICE DIALOG DEVICE AND VOICE DIALOG METHOD

(71) Applicant: TOYOTA JIDOSHA KABUSHIKI KAISHA, Toyota-shi, Aichi-ken (JP)

(72) Inventors: Atsushi Ikeno, Kyoto (JP); Muneaki Shimada, Tokyo-to (JP); Kota Hatanaka, Kama (JP); Toshifumi Nishijima, Kasugai (JP); Fuminori Kataoka, Nisshin (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 15/598,478

(22) Filed: May 18, 2017

(65) Prior Publication Data

US 2017/0345424 A1    Nov. 30, 2017

(30) Foreign Application Priority Data

May 31, 2016    (JP) .................................. 2016-109314

(51) Int. Cl.
| | |
|---|---|
| *G10L 15/22* | (2006.01) |
| *G10L 15/24* | (2013.01) |
| *G10L 25/63* | (2013.01) |
| *G06F 17/27* | (2006.01) |
| *G06K 9/00* | (2006.01) |

(52) U.S. Cl.
CPC .......... *G10L 15/22* (2013.01); *G06F 17/2785* (2013.01); *G06K 9/00* (2013.01); *G10L 15/24* (2013.01); *G10L 25/63* (2013.01); *G10L 2015/227* (2013.01)

(58) Field of Classification Search
CPC ......... G10L 15/22; G10L 25/63; G10L 15/24; G10L 2015/227; G06F 17/2785; G06K 9/00
USPC .......................................................... 704/251
See application file for complete search history.

(56) References Cited

U.S. PATENT DOCUMENTS

| | | | | |
|---|---|---|---|---|
| 9,336,268 | B1 * | 5/2016 | Moudy | G06F 16/244 |
| 10,130,261 | B2 * | 11/2018 | Tzvieli | G06K 9/00234 |
| 2006/0268099 | A1 * | 11/2006 | Potrebic | H04N 5/782 |
| | | | | 348/14.01 |

(Continued)

FOREIGN PATENT DOCUMENTS

| | | |
|---|---|---|
| JP | 2001-215993 A | 8/2001 |
| JP | 2006-178063 A | 7/2006 |

(Continued)

*Primary Examiner* — Edwin S Leland, III
(74) *Attorney, Agent, or Firm* — Oliff PLC

(57) ABSTRACT

A voice dialog device, comprises a voice processing unit configured to obtain a voice pronounced by a user and a result of recognizing the voice; a plurality of estimation units configured to estimate emotion of the user by different methods; and a response unit configured to create a response sentence, based on results of estimating the emotion of the user, and provide the response sentence to the user, wherein when a discrepancy exists between the results of estimating the emotion of the user by the plurality of estimation units, the response unit makes an inquiry to the user, and determines which estimation result is to be adopted, based on content of an obtained response.

5 Claims, 5 Drawing Sheets

(56) References Cited

U.S. PATENT DOCUMENTS

| | | | |
|---|---|---|---|
| 2007/0202477 A1* | 8/2007 | Nakagawa | A61B 5/14553 434/236 |
| 2009/0191521 A1* | 7/2009 | Paul | G10L 17/16 434/169 |
| 2010/0003969 A1* | 1/2010 | Isobe | H04M 3/533 455/412.1 |
| 2011/0093272 A1* | 4/2011 | Isobe | G10L 13/10 704/258 |
| 2014/0350349 A1* | 11/2014 | Geurts | A61B 5/0022 600/300 |
| 2015/0061825 A1* | 3/2015 | Suzuki | H04W 4/21 340/5.52 |
| 2015/0256675 A1* | 9/2015 | Sri | H04M 3/5183 379/265.09 |
| 2015/0341590 A1* | 11/2015 | Choe | G06F 16/58 348/207.1 |
| 2017/0046496 A1* | 2/2017 | Johnstone | G06Q 50/01 |
| 2017/0143246 A1* | 5/2017 | Flickinger | A61B 5/165 |
| 2017/0345424 A1* | 11/2017 | Ikeno | G10L 15/22 |
| 2018/0092589 A1* | 4/2018 | Tzvieli | A61B 5/0075 |
| 2018/0157739 A1* | 6/2018 | Khaitan | H04L 67/10 |
| 2019/0050875 A1* | 2/2019 | McCord | G06Q 30/0201 |

FOREIGN PATENT DOCUMENTS

| | | |
|---|---|---|
| JP | 2010-217502 A | 9/2010 |
| JP | 2015-013351 A | 1/2015 |

* cited by examiner

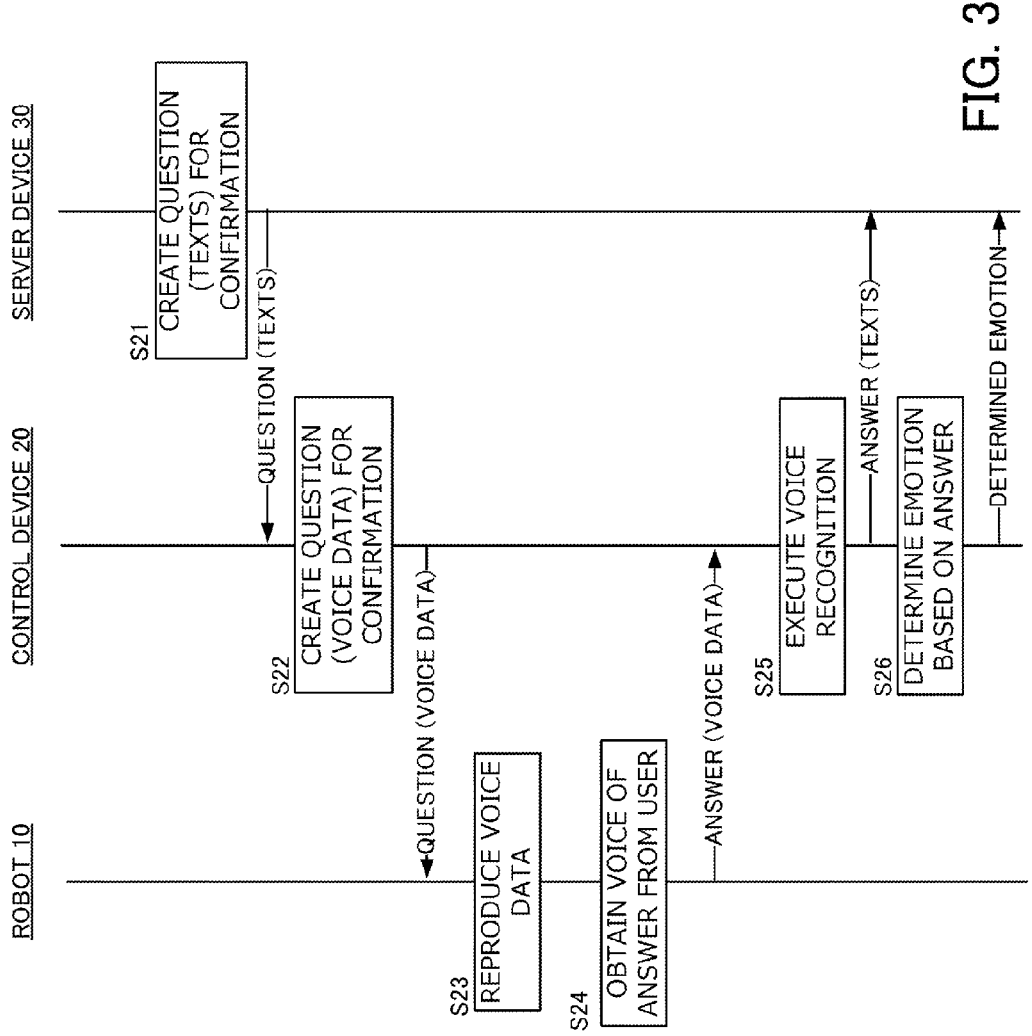

| FACE IMAGE | VOICE | SPEECH CONTENT | QUESTION |
|---|---|---|---|
| POSITIVE | POSITIVE | NEGATIVE | YOU LOOK CHEERFUL. ARE YOU SURE THAT (USER'S SPEECH CONTENT)? |
| POSITIVE | NEGATIVE | POSITIVE | YOU SOUND TIRED. ARE YOU SURE THAT (USER'S SPEECH CONTENT)? |
| NEGATIVE | POSITIVE | POSITIVE | YOU LOOK TIRED. ARE YOU SURE THAT (USER'S SPEECH CONTENT)? |
| POSITIVE | NEGATIVE | NEGATIVE | YOU LOOK CHEERFUL. ARE YOU SURE THAT (USER'S SPEECH CONTENT)? |
| NEGATIVE | POSITIVE | NEGATIVE | YOU SOUND CHEERFUL. ARE YOU SURE THAT (USER'S SPEECH CONTENT)? |
| NEGATIVE | NEGATIVE | POSITIVE | YOU LOOK TIRED. ARE YOU SURE THAT (USER'S SPEECH CONTENT)? |

FIG. 4

VOICE DIALOG DEVICE AND VOICE DIALOG METHOD

CROSS REFERENCE TO RELATED APPLICATION

This application claims the benefit of Japanese Patent Application No. 2016-109314, filed on May 31, 2016, which is hereby incorporated by reference herein in its entirety.

BACKGROUND OF THE INVENTION

Field of the Invention

The present invention relates to a device for dialog with a user by voice.

Description of the Related Art

In recent years, robots which provide various information through dialog with a person have been developed. For example, Japanese Patent Application Laid-Open No. 2015-013351 discloses a communication robot that processes on a network a voice having been input via a microphone, and returns by voice a response to the input.

Further, regarding a system that dialogs with a person by voice, known is a technology for reading the emotion of a user and creating a response, based on the emotion. For example, Japanese Patent Application Laid-Open No. 2001-215993 discloses a dialog processing device that obtains phrases pronounced by a user, the face image of the user, the physiological information on the user, etc., and creates a response sentence after estimating the emotion of the user.

SUMMARY OF THE INVENTION

As in the case of the device described in Japanese Patent Application Laid-Open No. 2001-215993, if emotion is estimated, based on a plurality of elements, the plurality of elements sometimes output respective different results.

For example, there is a case that an emotion of "sorrow" is estimated from the face image of a user, while an emotion of "joy" is estimated from the content of a speech by the user. In such a case, there is a question about how an appropriate response is to be determined.

The present invention has been developed in consideration of the above-described question, and an object of the invention is to improve the estimation accuracy on a voice dialog device for estimating the emotion of a user, based on a plurality of elements.

The present invention in its one aspect provides a voice dialog device comprising a voice processing unit configured to obtain a voice pronounced by a user and a result of recognizing the voice; a plurality of estimation units configured to estimate emotion of the user by different methods; and a response unit configured to create a response sentence, based on results of estimating the emotion of the user, and provide the response sentence to the user, wherein when a discrepancy exists between the results of estimating the emotion of the user by the plurality of estimation units, the response unit makes an inquiry to the user, and determines which estimation result is to be adopted, based on content of an obtained response.

A voice dialog device according to the present invention is a device that recognizes a voice pronounced by a user and creates and provides a response sentence after estimating the emotion of the user.

An estimation unit estimates the emotion of a user. The emotion of the user can be estimated, based on, for example, an expression, the pitch or tone of a voice, the content of a speech, and the like, however, it is not limited thereto. The voice dialog device according to the present invention includes a plurality of estimation units for estimating the emotion of a user by respective different methods.

A response unit creates a response sentence, based on results of estimation of emotion by the plurality of estimation units. A response sentence can be created, based on, for example, the content of a speech pronounced by a user and results of estimation of the emotion of the user.

Herein, there is a question what should be done in a case that a part of the plurality of estimation units have output a different result from that of the other estimation units. For example, in a case that a part of the estimation units has output an emotion of "joy" by estimation, and the other part has output an emotion of "sorrow" by estimation, it is a question on which emotion a creation of a response sentence should be based.

In contrast, the response unit of a voice dialog device according to the present invention makes an inquiry to a user and determines which estimation result is to be adopted, based on an obtained response. An inquiry is aimed at confirmation whether or not a certain estimation result is correct. For example, an inquiry may be one for directly confirming whether a result of estimation of emotion is correct, or may be one for indirectly confirming, by proceeding with conversation, whether or not a result of estimation of emotion is correct.

In such a manner, as it does not occur that a response is created, based on an uncertain estimation result, it is possible to return a more natural response to a user.

Also, the plurality of estimation units may include a first estimation unit configured to estimate the emotion of the user, based on content of a speech by the user, and a second estimation unit configured to estimate the emotion of the user by a method different from a method for the first estimation unit, and the response unit may make an inquiry to the user when a discrepancy exists between a result of estimating the emotion of the user by the first estimation unit and a result of estimating the emotion of the user by the second estimation unit.

An inquiry may be made when a discrepancy exists between a result of determining emotion, based on the content of a speech by a user, and a result of determining the emotion, based otherwise (for example, based on a result of observing the user). In such a manner, an emotion that hardly appears in a speech can be determined.

Also, the inquiry may be made to confirm actual emotion, after exhibiting that a discrepancy exists between the result of estimating the emotion of the user by the first estimation unit and the result of estimating the emotion of the user by the second estimation unit.

For example, if a result of estimating emotion, based on the content of a speech, and a result of estimating the emotion, based on an expression are different from each other, information on what the estimation of the emotion is based on, such as "You say you feel good, but you look sad?", may be given to the user. In such a manner, more accurate information can be derived from the user.

Also, the method different from the method for the first estimation unit may be the method which estimates the emotion of the user, based on a captured image of a face of the user or the voice obtained from the user.

As described above, by sensing an expression or a voice of a user, an emotion that hardly appears in a speech can be determined.

Also, the plurality of estimation units may estimate the emotion of the user, based on at least one of a captured image of a face of the user, the voice obtained from the user, and content of a speech of the user.

The estimation unit may, for example, convert a captured image of the face of a user or an obtained voice into a characteristic amount, and estimate emotion, based on this characteristic amount. Further, the estimation unit may estimate the emotion by recognizing a speech of a user and analyzing the content of the speech. Of course, other methods may be used. It is possible to improve the accuracy of estimation of emotion by using these different methods in combination.

Also, the inquiry may include information on the methods for estimating the emotion.

In such a manner, as information on what kind of determination the device has made can be given to the user, more accurate information can be derived from the user.

The present invention in its another aspect provides a voice dialog device, comprising a voice processing unit configured to obtain a voice pronounced by a user and a result of recognizing the voice; a plurality of estimation units configured to estimate emotion of the user by different methods; and a response unit configured to create a response sentence, based on results of estimating the emotion of the user, and provide the response sentence to the user, wherein when a discrepancy exists between the results of estimating the emotion of the user which have been output by the plurality of estimation units, the response unit obtains an estimation history that is results of estimation of emotion performed in past, and resolves the discrepancy, based on the estimation history.

If a discrepancy occurs between the results of estimating emotion by a plurality of estimation units, the discrepancy may be resolved, based on an estimation history in the past. For example, when an estimation unit has output an estimation result greatly departing from a past tendency, a low degree of reliability may be determined to correct or destroy the result of estimation performed by this estimation unit. Further, in a different way, a low degree of reliability of a certain estimation unit may be determined to correct or destroy a result of estimation performed by this estimation unit.

Also, the estimation history may include true or false information regarding whether a correct result has been obtained as a result of executing estimation of emotion by the respective estimation units in past, and in estimating emotion, the response unit may perform weighting for the respective estimation units, based on the true or false information.

A plurality of estimation units perform estimation of emotion by respective different methods, for example, by an expression, a voice, the content of a speech, or the like. Where or how the emotion tends to appear may be different, depending on the object person. In this situation, information regarding "true or false" obtained in performing estimation of emotion in the past is kept in advance, and weighting is performed on each estimation unit, based on this estimation history. Thus, it is possible to give a larger weight to estimation units capable of estimating emotion more accurately, and give a smaller weight to estimation units with a lower accuracy. In other words, it is possible to perform estimation of emotion by an optimistic method matching the object person.

Incidentally, according to the present invention, a voice dialog device including at least a part of the above-described units can be specified. Further, a voice dialog method executed by the above-described voice dialog device can also be specified. It is possible to use in a free combination of the above-described processes and units as long as no technical contradiction occurs.

According to the present invention, it is possible to improve the estimation accuracy of a voice dialog device for estimating the emotion of a user, based on a plurality of elements.

BRIEF DESCRIPTION OF THE DRAWINGS

FIG. 3 is a process flow diagram of the voice dialog system according to the embodiment;

FIG. 4 show examples of questions for confirming the emotion of a user; and

DESCRIPTION OF THE EMBODIMENTS

Figure 1:
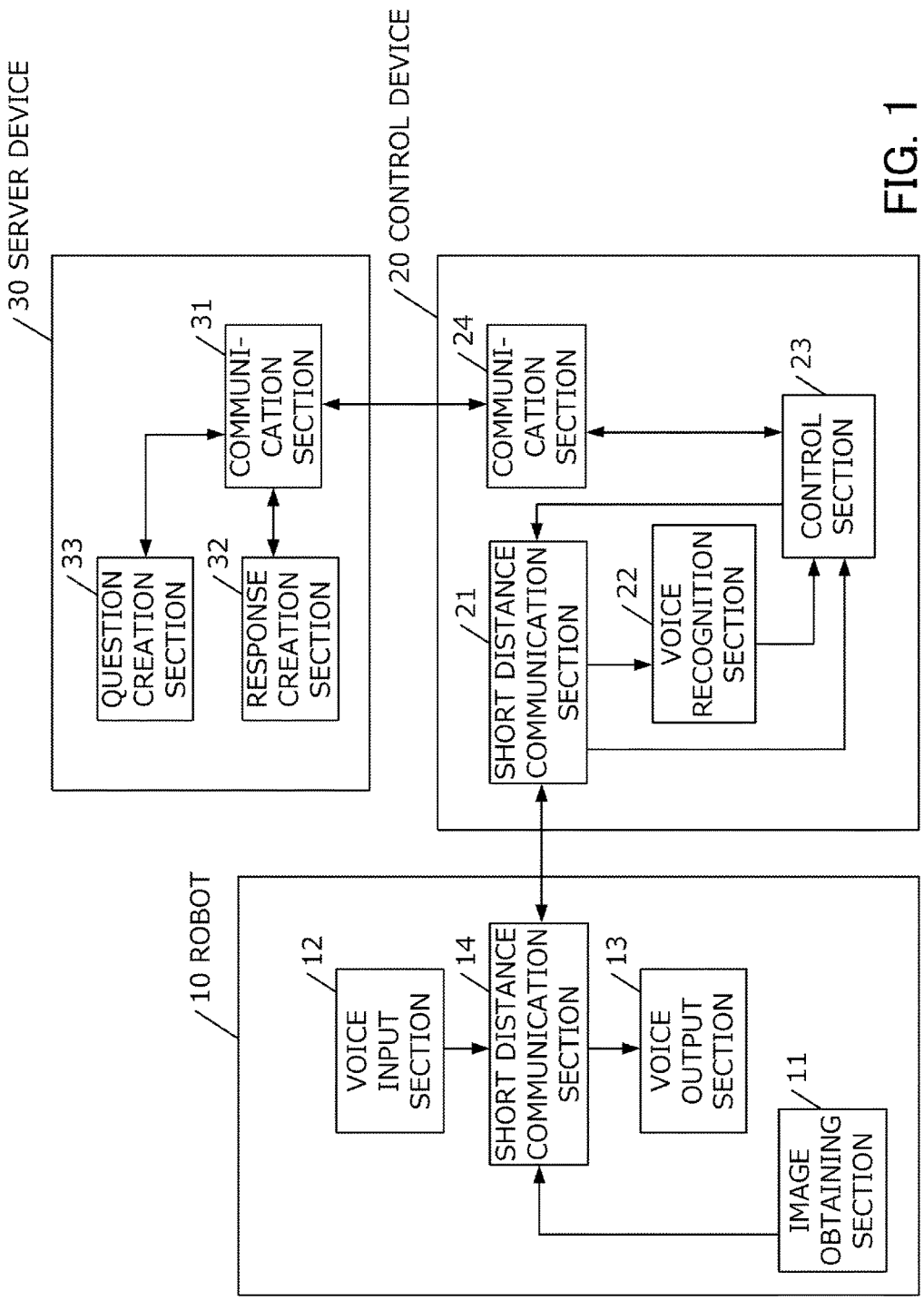
FIG. 1 is a system configuration diagram of a voice dialog system according to an embodiment.

Preferable embodiments of the invention will be described below, referring to the drawings.

A voice dialog systems according to the present embodiment is a system that obtains a voice pronounced by a user, performs voice recognition, and creates a response sentence, based on a result of the recognition, to thereby perform a dialog with the user.

(First Embodiment)
<System Configuration>

FIG. 1 is a system configuration diagram of a voice dialog system according to the present embodiment. The voice dialog system according to the present embodiment is configured by a robot 10, a control device 20, and a server device 30.

The robot 10 is a unit having a speaker, a microphone, a camera, and the like, and takes a role of an interface with users. The robot 10 may be a human-like robot, a character-like robot, or in a different shape.

The control device 20 is a device that issues control commands to the robot 10. In the present embodiment, the robot 10 functions only as a user interface, and the process for overall control of the system, such as recognizing the content of a speech, processing of others, and the like, are performed by the control device 20.

The server device 30 is a device that creates a response (response sentence) to be provided to the user, responding to a request transmitted from the control device 20.

First, the robot 10 will be described.

The robot 10 is configured by an image obtaining section 11, a voice input section 12, a voice output section 13, and a short distance communication section 14.

The image obtaining section 11 is a unit for obtaining an image (hereinafter, referred to as a face image) containing the face of a user, using a camera not shown. In the present embodiment, the image obtaining section 11 captures the image of the face of a user, using a camera attached to the front of the robot. The camera may be one for obtaining RGB images, one for obtaining grayscale images or infrared images, or the like. A face image obtained by the image obtaining section 11 is transmitted via the later-described short distance communication section 14 to the control device 20.

The voice input section 12 is a unit for obtaining a voice spoken by the user. Concretely, a microphone, not shown, is used to convert a voice into an electrical signal. (hereinafter, referred to as voice data). The obtained voice data is transmitted via the short distance communication section 14 to the control device 20, similarly to the face image.

The voice output section 13 is a unit for outputting a voice to be provided to the user. Concretely, using a speaker, not shown, the voice output section 13 converts the voice data transmitted from the control device 20 into a voice.

The short distance communication section 14 is a unit for performing short distance wireless communication with the control device 20. In the present embodiment, the short distance communication section 14 performs communication by the use of Bluetooth (registered trademark) connection. The short distance communication section 14 stores information related to the control device 20 to be a paring target, and can perform connection by easy operation.

The control device 20 will be described below. The control device 20 is a device for controlling the robot 10, and is typically a personal computer, a mobile phone, a smart phone, or the like. The control device 20 can be configured as an information processing device provided with a CPU, a main storage device, and an auxiliary storage device. Programs stored in the auxiliary storage device are loaded on the main storage device, executed by the CPU, and thus the respective units shown in FIG. 1 function. Incidentally, all or a part of the shown functions may be executed by the use of a circuit with a dedicated design.

The control device 20 is configured by a short distance communication section 21, a voice recognition section 22, a control section 23, and a communication section 24.

As the function of the short distance communication section 21 is similar to the above-described function of the short distance communication section 14, detailed description will be omitted.

The voice recognition section 22 is a unit that performs voice recognition of the voice obtained by the voice input section 12 and converts the voice into texts. The voice recognition can be performed by a known art. For example, the voice recognition section 22 stores an acoustic model and a recognition dictionary, compares the voice data and the acoustic model, extracts the characteristics of the acoustic data, matches the extracted characteristics with the recognition dictionary, and thereby performs voice recognition. The recognition result is transmitted to the control section 23.

The control section 23 is a unit that performs communication with the server device 30, based on the result of the voice recognition performed by the voice recognition section 22, and obtains a response. Concretely, the texts obtained as a result of performing voice recognition are transmitted to the server device 30 (both being described later) via the communication section 24, and a corresponding response is received from the server device 30. Further, the response is converted into voice data by a voice synthesizing function and is provided to the user via the voice output section 13. Thus, the user can perform conversation by a natural language.

Further, the control section 23 has a function to estimate the emotion of the user, based on information obtained from the robot 10. The estimated emotion is transmitted to the server device 30, and is utilized to create a response sentence. Concrete process contents will be described later.

The communication section 24 is a unit that performs communication with the server device 30 by accessing a network via a communication line (for example, a mobile phone network).

The server device 30 creates a response sentence to be provided to the user, and is configured by a communication section 31 and a response creation section 32.

As the function of the communication section 31 is similar to that of the above-described communication section 24, detail description will be omitted.

The response creation section 32 is a unit that creates a response sentence to be provided to the user, based on texts obtained from the control device 20. A response sentence to be provided to the user may be, for example, based on a dialog scenario stored in advance (dialog dictionary) or may be based on information obtained by searching a database or a web. Further, the response creation section 32 takes into account information on the emotion of the user obtained from the control device 20 in creating a response sentence. Detailed process contents will be described later.

The information obtained by the response creation section 32 is transmitted to the control device 20 in a text format, thereafter converted into a synthesized voice, and output to the user via the robot 10.

A question creation section 33 is a unit that creates questions for determining the emotion of the user, based on an instruction obtained from the control device 20. For example, if the control device 20 has judged that the emotion of the user cannot be uniquely determined, the question creation section 33 creates a question for determining the emotion of this user. Further, according to an answer by the user to this question, the control device 20 uniquely determines the emotion of the user. Detailed process contents will be described later.

The server device 30 also can be configured as an information processing device provided with a CPU, a main storage device, and an auxiliary storage device. Programs stored in the auxiliary storage device are loaded on the main storage device, executed by the CPU, and thus the respective units shown in FIG. 1 function. Incidentally, all or a part of the shown functions may be executed by the use of a dedicatedly designed circuit.

<Process Flow Chart>

In the following, a process executed by the respective units shown in FIG. 1 and the flow of data will be described, referring to FIG. 2, which is a flow chart diagram illustrating the process contents and the flow of data.

First, in step S11, the voice input section 12 of the robot 10 obtains a voice pronounced by the user via the microphone. The obtained voice is converted into voice data and transmitted via the communication sections to the voice recognition section 22 of the control device 20.

Subsequently, in step S12, the image obtaining section 11 of the robot 10 obtains a face image of the user via the camera. The obtained face image is transmitted via the communication sections to the control section 23 of the control device 20.

Subsequently, the voice recognition section 22 performs voice recognition on the obtained voice data and converts the data into texts (step S13). The texts obtained as a result of the voice recognition are transmitted to the control section 23. The control section 23 temporarily stores the obtained texts and transmits the texts to the response creation section 32 and the question creation section 33, which belong to the server device 30. Then, the response creation section 32 and the question creation section 33 temporarily store the obtained texts.

Subsequently, in step S14, the control section 23 estimates the emotion of the user, based on the obtained face image. In this step, the control section 23 converts the face image into a characteristic amount, and estimates the emotion, based on the characteristic amount. Herein, such characteristic amounts include, for example, an output result of a Gabor filter, however, are not limited thereto. For example, the estimation of emotion may be performed by comparison of a model, which is built up based on a learning data, and the characteristic amount. Incidentally, in the present embodiment, it will be assumed that the emotion of a user is categorized in two attributes (hereinafter, referred to as emotion polarity) of "positive" and "negative".

Subsequently, in step S15, the control section 23 executes emotion estimation, based on a voice. In this step, the voice is converted into a characteristic amount, and the emotion is estimated, based on this characteristic amount. The characteristic amount is, for example, the specter, strength, pitch, intonation, tempo, or the like of a voice, however, can be something other than these. Incidentally, in obtaining a characteristic amount, normalization may be performed to absorb difference between individuals. Further, in estimating emotion, for example, based on the characteristic amount or variation in the characteristic amount, the extent of adaptability to the individual emotion polarity may be computed for determination.

Subsequently, in step S16, the control section 23 executes emotion estimation, based on the content of a user's speech. For example, morphological analysis is performed on the content of speech obtained in step S13, and the emotion polarity is estimated, based on a result of the analysis. The estimation of emotion may be performed, for example, by comparison between a model built up based on learning data, and a result of the analysis.

An estimation result of emotion is transmitted to the response creation section 32 and question creation section 33 of the server device 30, and temporarily stored.

Herein, discussed will be a case in which there is a discrepancy between the estimation results of emotion performed in steps S14, S15, and S16. For example, discussed will be a case where the estimation result based on the face image is "negative", the estimation result based on the voice is "negative", and the estimation result based on the speech content is "positive". In such a case in which there is a discrepancy between estimation results based on a plurality of different references, a response sentence based on the emotion of the user cannot be created with accuracy. In this situation, in the present embodiment, in a case that any one of three estimation results is different from the others, it is determined which estimation result is to be adopted, by the process shown in FIG. 3.

Incidentally, in case that all of the three estimation results are the same, the process in FIG. 3 will be omitted, and the process proceeds to the process shown in FIG. 5 (described later).

The process in FIG. 3 will be described.

After completion of step S16, among the estimation results transmitted to the server device 30, if there is one that is different from the others, the response creation section 32 once stops creation of a response sentence, and the question creation section 33 creates a question necessary for determining the emotion of the user.

In step S21, based on the three emotion estimation results obtained immediately before and the speech content of the user, the question creation section 33 creates a question sentence for confirming the emotion of the user.

FIG. 4 is a diagram showing the combinations of the three emotion estimation results. As shown as examples, there are six patterns in which at least one of the three kinds of estimation results is different.

The question creation section 33 is provided in advance with the information shown in FIG. 4, and based on estimation results obtained from the control device 20, the question creation section 33 creates a question for inquiry to the user.

For example, if the estimation result based on the face image is "negative", the estimation result based on the voice is "positive", and the estimation result based on the speech content is "positive", the question creation section 33 creates a question such as "You do not look good. Are you sure that (speech content by the user)?" Incidentally, "the speech content by the user" refers to words the user pronounced immediately before.

The question sentence created in step S21 is transmitted to the control device 20, and voice creation (speech synthesis) is performed by the control section 23 (step S22). Then, the voice data is transmitted to the voice output section 13 of the robot 10, and provided to the user (step S23).

On the other hand, if the user having received the question answers the question by a voice, this voice is obtained in step S24, and is converted into texts in step S25. As this operation is similar to that in steps S11 and S13, description will be omitted. The texts obtained in step S25 are transmitted to the response creation section 32.

In step S26, based on the results of estimation of the emotions performed in steps S14 to S16 and the content of the answer obtained from the user, the emotion of the user is uniquely determined.

For example, discussed will be a case where the user spoke to the robot "I had a fun!" and determinations were made as "face image: negative", "voice: positive", and "speech content: positive". It will be assumed that the system makes an inquiry to the user, saying "You do not look good. Are you sure that you had a fun?", and the user answers to this, saying "I just got tired. I had a fun." In this case, as the user has made a speech denying the emotion polarity of "negative", the system determines that the emotion of the user is "positive". This result is transmitted from the control section 23 to the response creation section 32.

Figure 5:
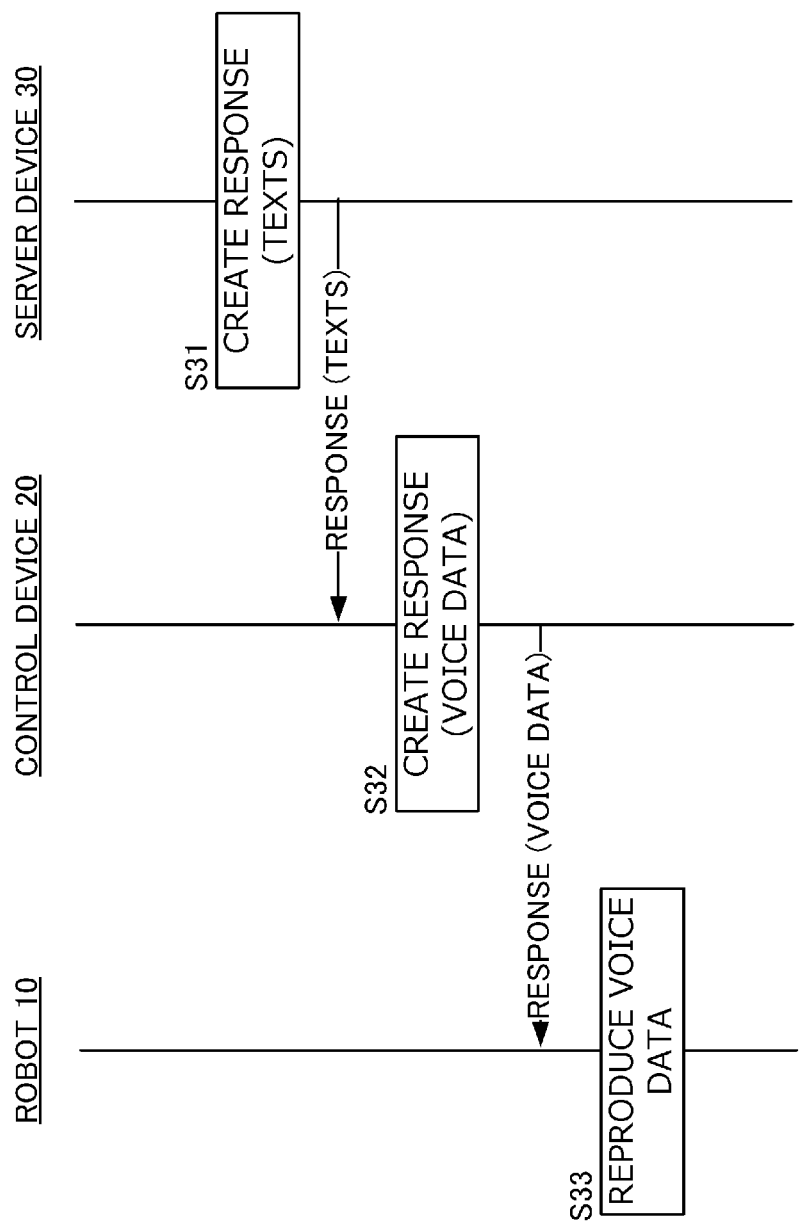
FIG. 5 is a process flow diagram of the voice dialog system according to the embodiment.

FIG. 5 will be referred to in the following description. FIG. 5 is a diagram of the flow after the emotion of the user has been uniquely determined. The response creation section 32 creates a response, based on the determined emotion of the user and the content of a speech obtained from the user (step S31). Herein, the speech obtained from the user may have the content obtained in step S13, or may have the content obtained in step S25 if the process in FIG. 3 has been executed.

Figure 2:
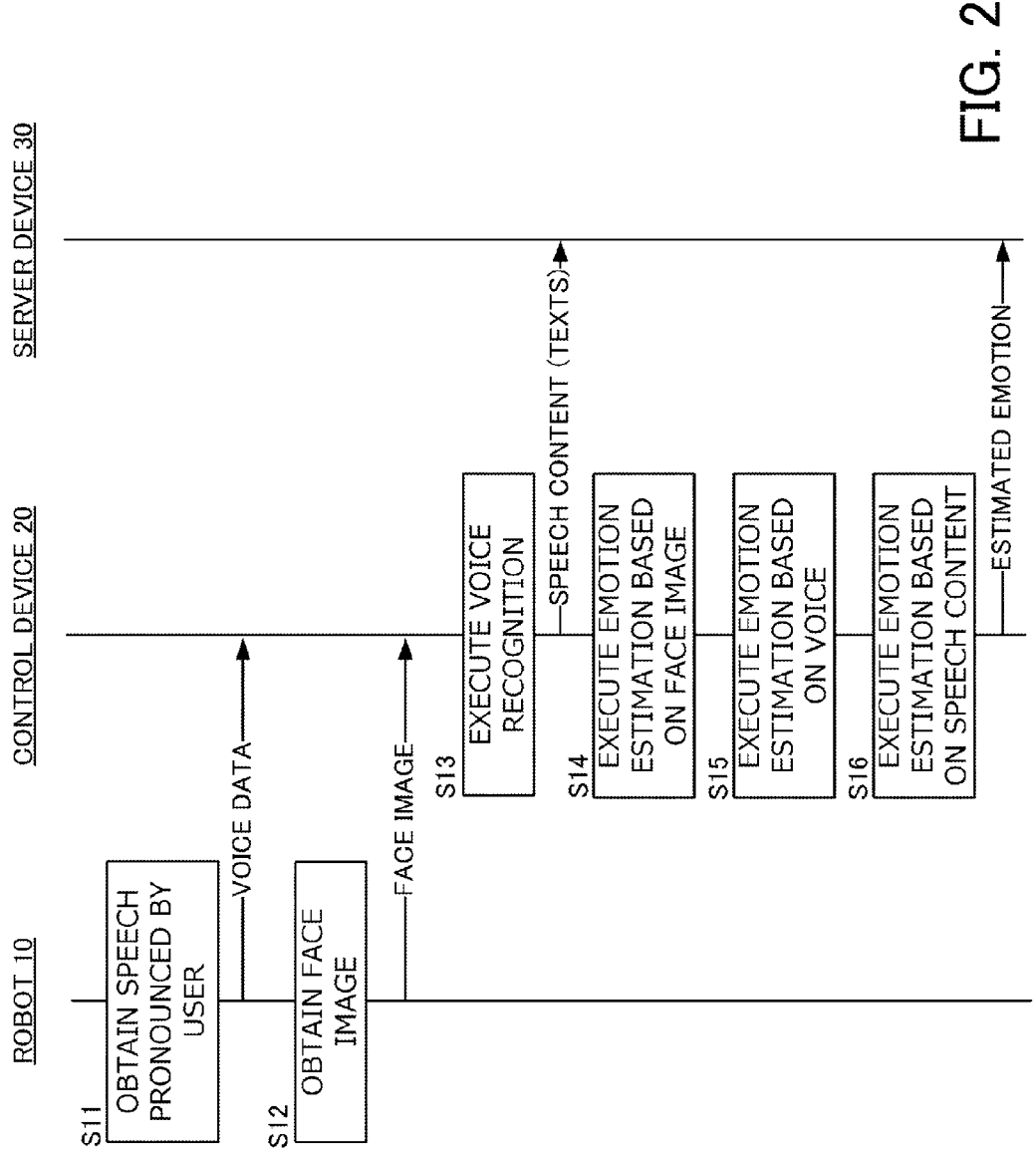
FIG. 2 is a process flow diagram of the voice dialog system according to the embodiment.

Incidentally, at the time the process in FIG. 2 is complete, if the emotion of the user has been uniquely determined, the process in FIG. 3 is skipped, and the process in FIG. 5 is started.

As has been described above, a response sentence may be created by the use of a dialog dictionary (dialog scenario) that the own device has, or may be created by the use of an externally existing information source (a database server or a web server). Further, this dialog dictionary (dialog scenario) may be one that is categorized in advance for respective emotions.

A created response sentence is transmitted to the control device 20, converted into voice data (step S32), and thereafter provided via the robot 10 to the user (step S33). As this process is similar to steps S22 and S23, description will be omitted.

For example, as the above-described example, if the user has answered, saying "I just got tired. I had a fun!", a positive response such as "That's good!" is pronounced from the robot.

On the other hand, if the user has made a negative answer saying "Do I look so? To be honest, I am tired.", the system determines that the emotion of the user is "negative". As a result of this, a negative reply or a reply of appreciation of painstaking efforts taken by the user, for example, "Sorry to hear that. Thanks for your efforts today." is pronounced by the robot.

As has been described above, the voice dialog system according to the present embodiment estimates the emotion of a user by a plurality of different methods, and if discrepancy between estimations has occurred, this discrepancy is resolved by making an inquiry to the user. By creating a response sentence, based on such obtained emotion of the user, it is prevented to create a response for which a wrong recognition of emotion is left as it is, and the accuracy of dialog can be improved.

(Second Embodiment)

A second embodiment is an embodiment in which the results of emotion estimation, which was performed in the past through the process from step S13 to S16, are taken into account to estimate emotion.

In the second embodiment, in the process in steps S13 to S16, results of estimating emotion are recorded as data in time series. Further, if a discrepancy has occurred between results of estimating emotion by a plurality of methods, the reliabilities of the results of estimating emotion are computed, based on this data in time series (in other words, emotion estimation results in the past).

Computation of reliability may be performed, for example, based on the amount of change in emotion. For example, if it is determined that a sudden change in emotion has occurred, the reliability may be decreased.

Then, an estimation result is determined, based on this reliability. For example, if the reliability is lower than or equal to a certain value, the estimation result may be discarded, and the immediately previous estimation result may be adopted.

Such a process is executed individually for respective emotion estimation methods. It will be assumed that, for example, estimation results which are "face image: negative", "voice: positive", and "speech content: positive" have been obtained. Herein, as a result of referring to past estimation results on face images, if a low reliability is computed, the estimation result on the face image may be discarded, and estimation of emotion may be performed, based only on voice and speech content.

As has been described above, according to the second embodiment, if discrepancy has occurred between results of performing emotion estimation by different methods, as an estimation result is corrected or discarded, based on past estimation results of emotion, this discrepancy is resolved. Thus, even if a drop in estimation accuracy has temporarily occurred during a dialog, it is possible to solve this problem.

Incidentally, in the second embodiment, the process shown in FIG. 3 is not essential. For example, without making an inquiry to a user, the emotion of the user may be determined by performing the above-described process.

(Third Embodiment)

In the first embodiment, if a discrepancy has occurred between results of estimating emotion, the discrepancy is resolved by making an inquiry to the user. In a third embodiment, based on these processing results, the weights of individual emotion estimation methods are computed, and emotion estimation is performed by the use of these weights.

In the third embodiment, in determining the emotion of a user in step S26, it is determined "by which estimation method/methods, a correct emotion estimation/estimations have been made". For example, it will be assumed here that, for example, results of "face image: negative", "voice: positive", and "speech content: positive" have been obtained, and as a result of making an inquiry, the estimation "face image: negative" have been found to be wrong. In this case, it is recognized that the estimation based on face image is wrong as a result, and estimations based on voice and speech content are correct as a result. Accordingly, the control section 23 makes the weight factor for "face image" small. Otherwise, the control section 23 makes the weight factors for "voice" and "speech content" large. The weight factors for individual estimation methods are accumulated, and will be used in subsequent emotion estimations.

Incidentally, weight factors are preferably stored in association with users. For example, association may be done, by identifying a user, based on an obtained face image or voice.

According to the third embodiment, for example, for a user whose emotion tends to be hardly expressed on the face, a small weight factor can be given to an estimation result, based on a face image, and for a user whose emotion tends to be expressed well in the voice, a large weight factor can be given to an estimation result, based on a voice. In other words, it is possible to perform emotion estimation that fits a user's tendency, and thus, the estimation accuracy of emotion improves.

Incidentally, in the third embodiment, based on results of making an inquiry to a user, information of "emotion estimations by which estimation methods have been correct" was created and accumulated, however, this information may be created in a way other than making an inquiry to a user.

(Modified Example)

The above-described embodiments are no more than examples, and the invention can be changed and modified, as appropriate, within a range without departing from the spirit of the invention.

For example, in the description of the foregoing embodiments, the voice recognition section 22 performed voice recognition, however, voice recognition may be performed on the server device 30. In this case, the control device 20 may transfer voice data to the server device.

Further, in the description of the foregoing embodiments, three kinds of emotion estimation methods were used, however, two kinds or even four or more kinds of emotion estimation methods may be used in combination.

Still further, in the description of the foregoing embodiments, the emotion of a user was categorized in two kinds, which are "positive" and "negative", however, more than two kinds of emotion may be applied. In this occasion, if emotion estimation is performed by different methods, more than two estimation results are simultaneously obtained in some cases. In this occasion, narrowing may be done by an arbitrary method. Further, if narrowing cannot be done by one inquiry, the emotion of the user may be uniquely determined by making an inquiry a plurality of times. Still further, even when the emotion of a user cannot be uniquely determined, if the probability that the user has a certain emotion is high, the process may be proceeded on assumption that the user has this emotion.

Yet further, in the foregoing embodiments, questions for directly confirming a user about emotion such as "You are surely having a fun?" were presented, the emotion of the user may be indirectly confirmed. For example, by performing additional dialog, a correct emotion may be estimated, based on information additionally obtained.

What is claimed is:

1. A voice dialog device, comprising a processor configured to perform steps of:
   a voice processing step of obtaining a voice pronounced by a user and a result of recognizing the voice;
   a plurality of estimating steps of estimating emotion of the user by different estimation methods; and
   a responding step of creating a response sentence, based on results of estimating the emotion of the user, and providing the response sentence to the user, wherein
   in the responding step, when a discrepancy exists between the emotions of the user estimated by the plurality of estimation methods respectively, an estimation history that is results of estimation of emotion performed at a previous time is obtained, and the discrepancy is resolved based on the estimation history.

2. The voice dialog device according to claim 1, wherein the estimation history includes true or false information regarding whether a correct result has been obtained as a result of executing estimation of emotion by the respective estimation methods at the previous time, and
   in the responding step, weighting for the respective estimation methods is performed based on the true or false information.

3. A voice dialog method executed by a voice dialog device, the method comprising:
   a voice processing step of obtaining a voice pronounced by a user and a result of recognizing the voice;
   a plurality of estimating steps of estimating emotion of the user by different estimation methods; and
   a responding step of creating a response sentence, based on results of estimating the emotion of the user, and providing the response sentence to the user, wherein
   in the responding step, when a discrepancy exists between the emotions of the user estimated by the plurality of estimation methods respectively, an estimation history that is results of estimation of emotion performed at a previous time is obtained, and the discrepancy is resolved based on the estimation history.

4. The voice dialog method according to claim 3, wherein the estimation history includes true or false information regarding whether a correct result has been obtained as a result of executing estimation of emotion by the respective estimation methods at the previous time, and
   in the responding step, weighting for the respective estimation methods are performed based on the true or false information.

5. A non-transitory computer readable storing medium recording a computer program for causing a computer to perform a method comprising:
   a voice processing step of obtaining a voice pronounced by a user and a result of recognizing the voice;
   a plurality of estimating steps of estimating emotion of the user by different estimation methods; and
   a responding step of creating a response sentence, based on results of estimating the emotion of the user, and providing the response sentence to the user, wherein
   in the responding step, when a discrepancy exists between the emotions of the user estimated by the plurality of estimation methods respectively, an estimation history that is results of estimation of emotion performed at a previous time is obtained, and the discrepancy is resolved based on the estimation history.

* * * * *